(12) United States Patent
Baumann et al.

(10) Patent No.: US 7,600,995 B2
(45) Date of Patent: Oct. 13, 2009

(54) HOT RUNNER HAVING REDUCED VALVE-STEM DROOL

(75) Inventors: Michael Baumann, Trier (DE); Daniel Hontheim, Bettingen (DE); Gilles Lacome, Avril (FR)

(73) Assignee: Husky Injection Molding Systems Ltd., Bolton, ON (CA)

( * ) Notice: Subject to any disclaimer, the term of this patent is extended or adjusted under 35 U.S.C. 154(b) by 226 days.

(21) Appl. No.: 11/930,212

(22) Filed: Oct. 31, 2007

(65) Prior Publication Data

US 2009/0110762 A1   Apr. 30, 2009

(51) Int. Cl.
*B29C 45/23* (2006.01)
(52) U.S. Cl. .................................. 425/564; 425/566
(58) Field of Classification Search .............. 425/562, 425/563, 564, 565, 566
See application file for complete search history.

(56) References Cited

U.S. PATENT DOCUMENTS

| | | | |
|---|---|---|---|
| 4,213,751 A * | 7/1980 | Fernandez | 425/566 |
| 5,151,278 A * | 9/1992 | Baxi et al. | 425/564 |
| 5,387,099 A | 2/1995 | Gellert | |
| 6,840,758 B2 | 1/2005 | Babin et al. | |
| 2006/0153945 A1 | 7/2006 | Blais et al. | |
| 2006/0177538 A1* | 8/2006 | Tabassi | 425/564 |

FOREIGN PATENT DOCUMENTS

| CA | 2402863 A1 | 10/2001 |
|---|---|---|
| CA | 2523636 A1 | 4/2006 |

* cited by examiner

*Primary Examiner*—Tim Heitbrink

(57) ABSTRACT

Disclosed is a valve-gated hot-runner system, having: (i) a back-up sealing arrangement, including: (i) a plurality of radial gaps associated with a valve stem of a valve actuator, and (ii) a cooling system being positioned relative to the plurality of radial gaps, the cooling system being configured to freeze a drool being made to enter, under pressure, into the plurality of radial gaps, so that the drool that becomes frozen substantially reduces flow of the drool along the valve stem and toward the valve actuator.

21 Claims, 7 Drawing Sheets

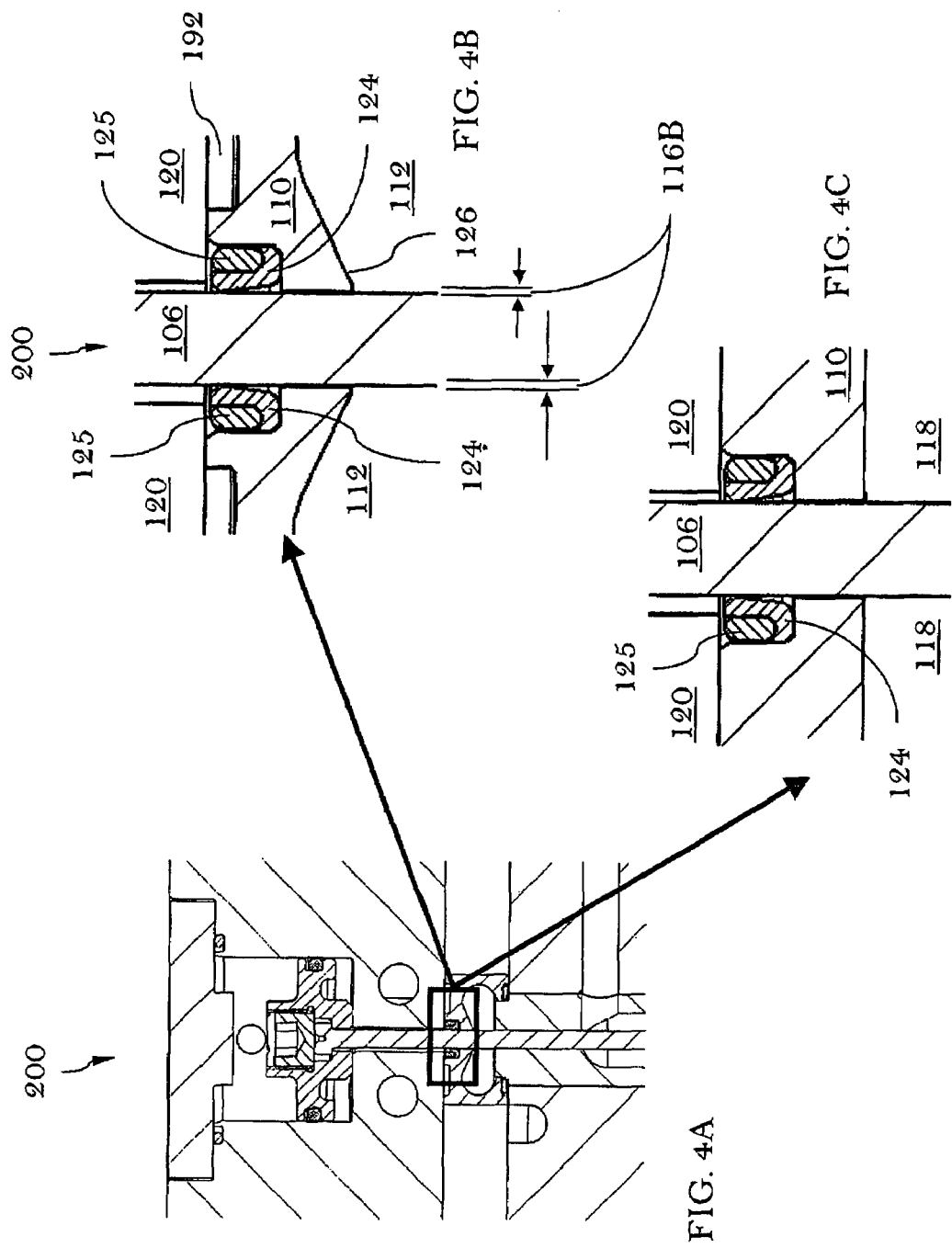

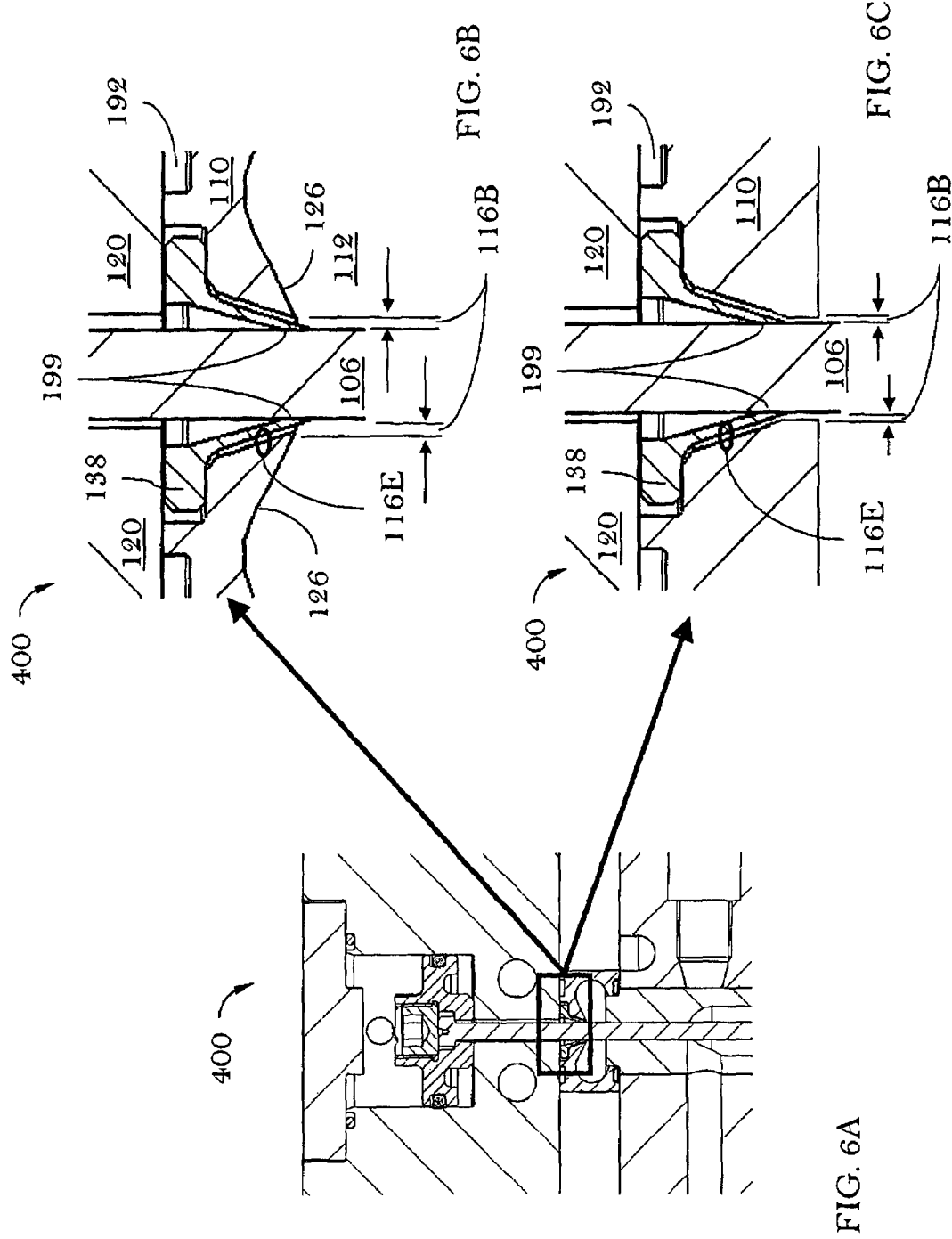

HOT RUNNER HAVING REDUCED VALVE-STEM DROOL

TECHNICAL FIELD

The present invention generally relates to, but is not limited to, injection-molding systems, and more specifically the present invention relates to, but is not limited to, (i) hot runners, and/or (ii) valve-gated hot-runner systems, including a back-up pad configured to substantially reduce a flow of a drool that is made to flow, under pressure, along a valve stem.

BACKGROUND

Examples of known molding systems are (amongst others): (i) the HyPET (trademark) Molding System, (ii) the Quadloc (trademark) Molding System, (iii) the Hylectric (trademark) Molding System, and (iv) the HyMET (trademark) Molding System, all manufactured by Husky Injection-Molding Systems (Location: Canada; www.husky.ca).

FIG. 1A depicts a known valve-gated hot-runner system according to U.S. Patent Application No. 2006/0153945A1 (Inventor: BLAIS et al.; Published: 2006 Jul. 13), which discloses a valve stem that has a reverse taper thereon used in an injection nozzle for a hot runner system. The valve stem is moved downward into a closed position, such that a valve-stem tip plugs or blocks an opening in a gate area, thereby precluding molten plastic from exiting the injection nozzle. The valve stem is moved upward into an open position, thereby allowing molten plastic to flow from the injection nozzle. In the open position, the reverse taper seals a clearance between the valve stem and a manifold bushing, thereby precluding stem leakage or weepage. The reverse taper has a diameter which is larger than an internal diameter of internal passage of the valve bushing or manifold bushing. The valve stem also includes a headless end. According to BLAIS, at page two, paragraph sixteen: "a valve stem is coaxially to and operatively mounted in at least a portion of an internal passage of a nozzle and internal passage of either a valve bushing or a manifold bushing in a hot runner system. The valve stem includes: (i) a shaft movably mounted in the internal passages of the nozzle and either the valve bushing or the manifold bushing, (ii) a first end of the shaft, for plugging an opening in a mold cavity in a first, position, and (iii) a reverse taper on the shaft, for sealing a clearance between the valve stem and either the valve bushing or the manifold bushing in a second position."

FIG. 1B depicts a known valve-gated hot-runner system according to U.S. Pat. No. 6,840,758 (Inventor: BABIN et al.; Published: 2005 Jan. 11), which discloses a valve bushing assembly for use in an injection-molding apparatus. The injection-molding apparatus includes a manifold block, a valve pin, and an actuator block. The manifold block has at least one melt channel therein. The manifold block has an exterior surface that faces the actuator block, and has a manifold pass-through extending from the exterior surface to the at least one melt channel. The manifold pass-through has a manifold sealing surface therein. The manifold pass-through permits the valve pin to pass therethrough. The actuator block has an actuator attached thereto that is operatively connected to the valve pin. The valve bushing assembly includes a bushing and a spacer. The bushing is adapted to be received in the manifold pass-through. The bushing has a bushing pass-through that is adapted to align with the manifold pass-through and is adapted to slidably receive the valve pin. The bushing has a bushing sealing surface that is adapted to cooperate with the manifold sealing surface to inhibit melt leakage therebetween. The bushing has a bushing shoulder. The spacer is positioned between the manifold block and the actuator block to space the manifold block and the actuator block from each other. The spacer has a first spacer surface that is adapted to contact the actuator block. The spacer has a second spacer surface that is adapted to contact the bushing shoulder. The spacer is adapted to be substantially free of contact with the manifold block. According to BABIN et al. at column five from lines 28 to 36: "The bushing pass-through extends along an axis, and is defined by a bushing pass-through surface. One or more annular grooves may be positioned along the length of the bushing pass-through surface. When the valve pin is positioned in the bushing pass-through, the grooves act as chambers and can be used to collect melt that leaks between bushing and the valve pin. Any melt that seeps into grooves may harden and help to seal against further melt leakage out of manifold melt channel." According to BABIN et al. at column seven from lines 21 to 27: "Referring to FIG. 2, the spacer may be used to thermally insulate the manifold block from the actuator block. The spacer may also be used to help retain the bushing in place in manifold pass-through and to improve the seal between the bushing sealing surface on bushing and the manifold sealing surface." According to BABIN et al. at column seven from lines 51 to 59: "The contact area between the second spacer surface and the shoulder may be made relatively small, to reduce the heat transfer between the manifold block and the spacer. Because the shoulder is slightly above the surface of the manifold block, an air gap exists between the second spacer surface and the surface, to further reduce the heat transfer between the manifold block and the spacer."

FIG. 1C depicts a known valve-gated hot-runner system according to U.S. Pat. No. 5,387,099 (Inventor: GELLERT; Published: 1995 Feb. 07), which discloses a valve gated injection-molding apparatus wherein the reciprocating valve member extends into the melt passage through a sealing bushing. The sealing bushing has a thin steel collar portion which extends forwardly into the melt passage and fits around the valve member to form a seal against leakage of melt rearwardly along the valve member. In the preferred embodiments, the collar portion is thin enough that it is slightly compressed around the valve member by the pressure of the surrounding melt in the melt passage to improve the seal. According to GELLERT at column three from lines 12 to 18: "The elongated valve member extends into the melt passage in the sealing bushing and in order to avoid a problem of the pressurized melt leaking rearwardly along the reciprocating valve member, the sealing bushing has a collar portion which extends forwardly into the melt passage around the valve member."

SUMMARY

The inventors believe that the problem associated with known valve-gated hot-runner systems is not understood by persons of skill in the art. The inventors believe that known valve-gated hot-runner systems permit leakage (or flow) of a drool along a valve stem. This condition may lead to increased maintenance due to periodic removal of accumulated drool, which increases operating costs associated with using the known valve-gated hot-runner systems. This condition may also lead to reduced gate quality associated with a surface of a molded part (sometimes called "posting issue"), which requires periodic remove of accumulated drool once the accumulated drool inadvertently acts to restrict and/or to interfere with reliable operation of a valve actuator that is coupled with the valve stem, which increases operating costs associated with using the known valve-gated hot-runner systems.

The inventors believe that the aspects of the non-limiting embodiments associated with the present invention provide advantageous technical effects; that is, the non-limiting embodiments reduce or mitigate, at least in part, maintenance associated with the known valve-gated hot-runner systems by: (i) substantially reducing leakage or flow of the drool along the valve stem, and (ii) substantially preventing the drool from causing restriction and interference of operation of the valve actuator that is coupled with the valve stem.

According to a first aspect of the present invention, there is provided a valve-gated hot-runner system, having a back-up sealing arrangement, including: (i) a plurality of radial gaps associated with a valve stem of a valve actuator, and (ii) a cooling system being positioned relative to the plurality of radial gaps, the cooling system being configured to freeze a drool being made to enter, under pressure, into the plurality of radial gaps, so that the drool that becomes frozen substantially reduces flow of the drool along the valve stem and toward the valve actuator.

According to a second aspect of the present invention, there is provided a valve-gated hot-runner system, including: (i) a first radial gap being located between an actuator plate and a valve stem, the valve stem being operatively attached with the valve actuator, (ii) a second radial gap being located between a back-up pad and the valve stem, (iii) a third radial gap being located between a manifold bushing and the valve stem, and (iv) a cooling system being positioned relative to the first radial gap, the second radial gap and the third radial gap, the cooling system being configured to freeze a drool being made to enter, under pressure, into the first radial gap, the second radial gap and the third radial gap, so that the drool that becomes frozen substantially reduces flow of the drool along the valve stem and toward the valve actuator.

According to a third aspect of the present invention, there is provided a valve-gated hot-runner system, including: (I) a valve actuator, (II) a valve stem being operatively attached with the valve actuator, (III) an actuator plate accommodating the valve actuator, the actuator plate being configured to: (i) receive, at least in part, the valve stem, and (ii) permit sliding movement of the valve stem relative to the actuator plate, the actuator plate and the valve stem, in combination, defining a first radial gap being located between the actuator plate and the valve stem, (IV) a back-up pad being configured to: (i) receive, at least in part, the valve stem, and (ii) permit sliding movement of the valve stem relative to the back-up pad, the back-up pad abutting the actuator plate, the back-up pad and the valve stem defining, in combination, a second radial gap being located between the back-up pad and the valve stem, (V) a manifold being offset from the actuator plate, the actuator plate in combination with the manifold defining an air gap, the air gap being located between the actuator plate and the manifold, the back-up pad being located between the actuator plate and the manifold, the back-up pad abutting the manifold, (VI) a manifold bushing being received in the manifold, the manifold bushing being configured to: (i) receive, at least in part, the valve stem, and (ii) permit sliding movement of the valve stem relative to the manifold bushing, the manifold bushing and the valve stem defining, in combination, a third radial gap being located between the manifold bushing and the valve stem, and (VII) a cooling system being positioned relative to the first radial gap, the second radial gap and the third radial gap, the cooling system being configured to freeze a drool being made to enter, under pressure, into the first radial gap, the second radial gap and the third radial gap, so that the drool that becomes frozen in the first radial gap, the second radial gap and the third radial gap, substantially blocks a flow of the drool past the first radial gap, the second radial gap and the third radial gap and along the valve stem toward the valve actuator, and along the valve stem toward the valve actuator.

DETAILED DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIGS. 4A, 4B and 4C depict cross-sectional views of a valve-gated hot-runner system 200 (hereafter referred to as the "system 200") according to a second non-limiting embodiment;

Figure 1A:
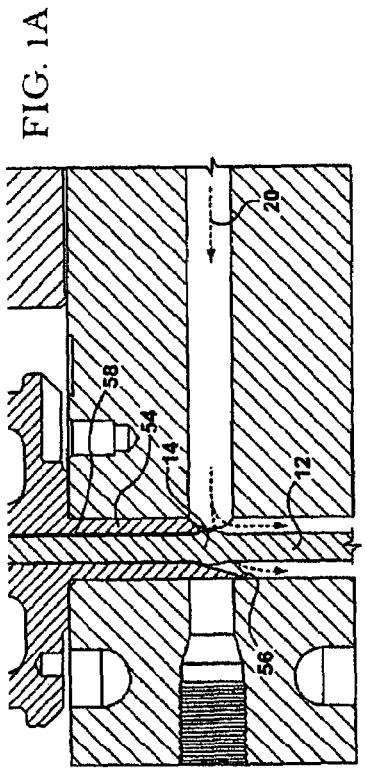
FIGS. 1A, 1B and 1C depict the known valve-gated hot-runner systems.
Figure 1B:
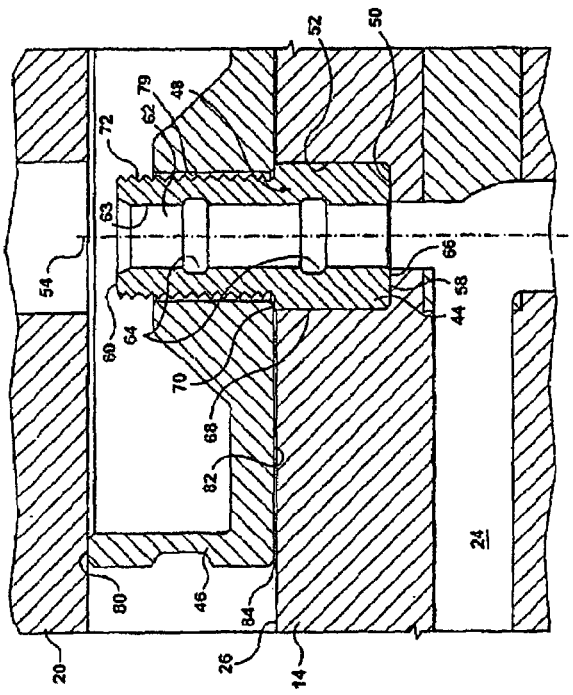
Figure 1C:
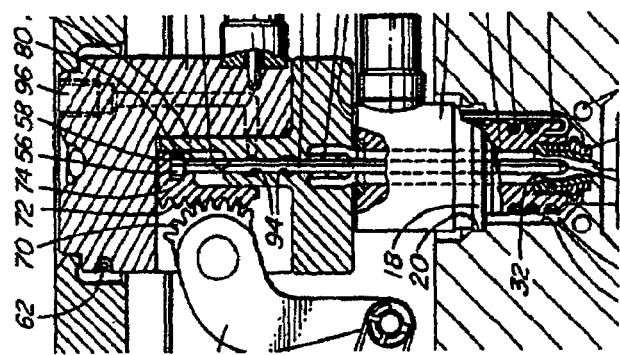

FIGS. 5A, 5B, 5C and 5D depict cross-sectional views of a valve-gated hot-runner system 300 (hereafter referred to as the "system 300") according to a third non-limiting embodiment; and FIGS. 6A, 6B and 6C depict cross-sectional views of a valve-gated hot-runner system 400 (hereafter referred to as the "system 400") according to a fourth non-limiting embodiment.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

REFERENCE NUMERALS USED IN THE DRAWINGS

The following is a listing of the elements designated to each reference numeral used in the drawings:
valve-gated hot-runner system 100
valve-gated hot-runner system 200
valve-gated hot-runner system 300
valve-gated hot-runner system 400
manifold 102
melt passageway 104
valve stem 106
valve actuator 108
drool 109
back-up pad 110
drool-capturing chamber 112
cooling system 114
first radial gap 116A
second radial gap 116B
third radial gap 116C
stem-to-insert radial gap 116D
pad-to-insert radial gap 116E
back-up sealing arrangement 117
manifold bushing 118
actuator plate 120
air gap 122
elastomer element 125 sealing element 124
cold inner surface 126
thermal profile 128
injection side 130
clamp side 132
insert 136
insert body 138
piston 160
set screw 162
rod side 166
piston chamber 164
bore side 168
air cover plate 170
piston seal 172
o-ring 174
chamfer 175
air-supply channel 176
stem channel 179
double "c" ring 180
manifold heater 182
manifold plug 184
axis of movement 188
direction of melt flow 186
heat-moderating groove 192
direction of melt flow 190
contact area 199

DETAILED DESCRIPTION OF THE
NON-LIMITING EMBODIMENTS

Figure 2:
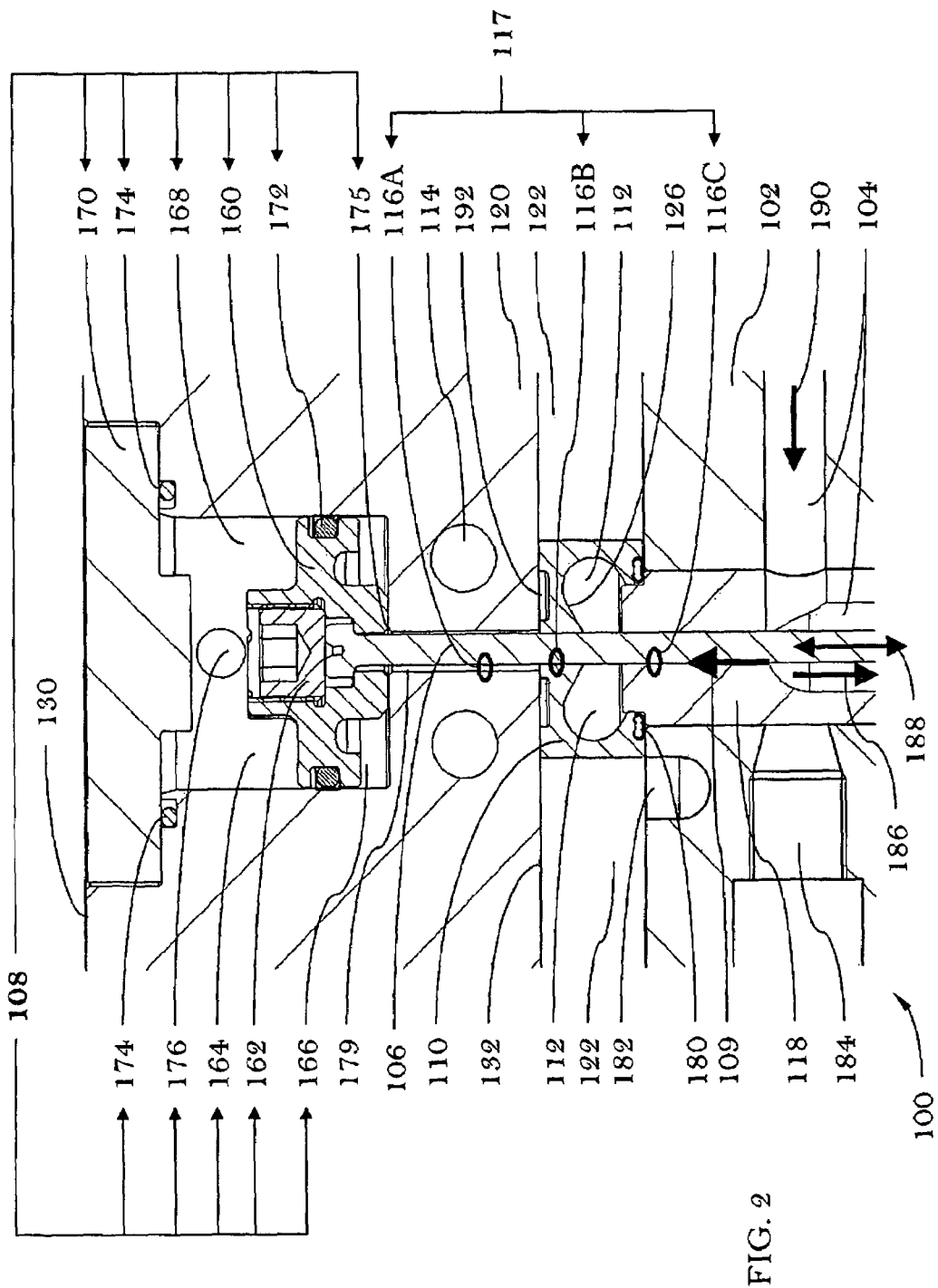
FIG. 2 depicts a cross-sectional view of a valve-gated hot-runner system 100 (hereafter referred to as the "system 100") according to a first non-limiting embodiment.

FIG. 2 depicts the cross-sectional view of the system 100 according with the first non-limiting embodiment, in which the system 100 includes: (i) a valve actuator 108, (ii) a valve stem 106, (iii) an actuator plate 120, (iv) a back-up pad 110, (v) a manifold 102, (vi) a manifold bushing 118, and (vii) a cooling system 114. The system 100 is: (i) provided with an injection-molding system (not depicted, but known), or (ii) sold for use with the injection-molding system (that is, they are sold separately).

The valve stem 106 is operatively attached (coupled) with the valve actuator 108, so that the valve actuator 108 may actuate movement of the valve stem 106.

The actuator plate 120 includes: (i) an injection side 130, and (ii) a clamp side 132. The clamp side 132 of the actuator plate 120 abuts the back-up pad 110. The actuator plate 120 accommodates the valve actuator 108 at the injection side 130. According to a non-limiting variant (not depicted), the valve actuator 108 is accommodated or installed on the clamp side 132 of the actuator plate 120. The actuator plate 120 and the valve stem 106 define a first radial gap 116A that is located between the actuator plate 120 and the valve stem 106. The actuator plate 120 is configured to: (i) receive, at least in part, the valve stem 106, and (ii) permit sliding movement of the valve stem 106 relative to the actuator plate 120. Specifically, the actuator plate 120 defines a stem channel 179 that is used to receive the valve stem 106, so that first radial gap 116A is located in the stem channel 179.

The back-up pad 110 and the valve stem 106 define a second radial gap 116B that is located between the back-up pad 110 and the valve stem 106. The back-up pad 110 is configured to: (i) receive, at least in part, the valve stem 106, and (ii) permit sliding movement of the valve stem 106 relative to the back-up pad 110. The back-up pad 110 is configured to slidably guide the valve stem 106 once the valve actuator 108 has actuated movement of the valve stem 106. The back-up pad 110 is also configured to substantially reduce the flow associated with a drool 109 that is made to flow, under pressure, from the melt passageway 104 along the valve stem 106 and toward the valve actuator 108.

The manifold 102 is offset from the actuator plate 120. The back-up pad 110 is located between the actuator plate 120 and the manifold 102. The back-up pad 110 abuts the manifold 102 and abuts the actuator plate 120. The actuator plate 120 and the manifold 102 define an air gap 122. The air gap 122 is located between the actuator plate 120 and the manifold 102. The air gap 122 acts as a heat insulator that helps to reduce the flow of heat energy from the manifold 102. The valve stem 106 extends into a melt passageway 104 that is defined by the manifold 102. The melt passageway 104 is configured to convey, under pressure, a melt toward, along the arrows as indicated in FIG. 2, a gate (not depicted, but known) that leads to a mold cavity (not depicted, but known) that is defined by a mold (not depicted, but known). In order to manufacture the melt passageway 104, a hole was drilled into a side wall of the manifold 102. A manifold plug 184 is used to plug a portion of the drilled hole so as to prevent leakage of the melt from the side wall of the manifold 102.

The manifold bushing 118 is received in a channel that is defined by the manifold 102. Generally, the back-up pad 110 abuts the manifold bushing 118. Specifically, the manifold bushing 118 defines an outer circumferential shoulder at an end of the manifold bushing 118. The outer circumferential shoulder is configured to interface and abut with the back-up pad 110, so that the back-up pad 110 may be securely located relative to the manifold bushing 118. A double "c" ring 180 is placed at an interface that is located where the manifold bushing 118, the back-up pad 110 and the manifold 102 meet, so that the manifold bushing 118 may be retained in the manifold and sealed with: (i) the back-up pad 110, and (ii) the manifold 102. The manifold bushing 118 is used to accommodate (or interface with) an injection nozzle (not depicted, but known). The injection nozzle is configured to interact with the valve stem 106. The manifold bushing 118 and the valve stem 106 define a third radial gap 116C that is located between the manifold bushing 118 and the valve stem 106. The manifold bushing 118 is configured to: (i) receive, at least in part, the valve stem 106, and (ii) permit sliding movement of the valve stem 106 relative to the manifold bushing 118.

The cooling system 114 is positioned relative to the first radial gap 116A, the second radial gap 116B and the third radial gap 116C. Generally, the cooling system 114 is defined by the actuator plate 120. The cooling system 114 is configured to freeze the drool 109 that is made to enter, under pressure, into the first radial gap 116A, the second radial gap 116B and the third radial gap 116C. In this manner, the drool 109 that becomes frozen in the first radial gap 116A, the second radial gap 116B and the third radial gap 116C, substantially reduces a flow of the drool 109 past the first radial gap 116A, the second radial gap 116B and the third radial gap 116C and along the valve stem 106 toward the valve actuator 108. In this manner, the service life of the valve actuator 108 is advantageously prolonged (that is, the drool 109 is substantially prevented from contaminating the mechanisms associated with the valve actuator 108).

Initially, the molten molding material is not made to flow in the melt passageway 104, the manifold 102 is preheated (using one or more manifold heaters, etc), and the cooling system 114 is actuated. Then the molten molding material is made to flow in the melt passageway 104, and in response the cooling system 114 acts to freeze the drool 109 that happens to flow into the third radial gap 116C, so that the flow of the drool 109 is substantially reduced past the frozen drool located in the third radial gap 116C (so that the drool 109 has no opportunity to flow toward the second radial gap 116B and the first radial gap 116A). In this case, the drool does not have an opportunity to become frozen in first radial gap 116A and the second radial gap 116B.

For the case where the manifold 102 receives sufficiently enough additional heat energy, the frozen drool that is located in the third radial gap 116C may become unfrozen (that is, liquefied), and the drool 109 may then flow past the third radial gap 116C along the valve stem 106 toward: (i) the valve actuator 108, and (ii) the second radial gap 116B and the first radial gap 116A. In this case, the drool 109 may become frozen in the second radial gap 116B, provided that the cooling system 114 has sufficient influence to freeze the drool 109 in the second radial gap 116B. Eventually, heating of the manifold 102 may temporarily reduce enough so that: (i) the drool 109 may become re-frozen in the third radial gap 116C, (ii) while the drool 109 remains frozen in the second radial gap 116B, and (iii) the first radial gap 116A continues to be free of any frozen drool (for this case).

For the case where the back-up pad 110 and the manifold 102 receive additional heat energy (due to changing or dynamic operating conditions of the molding operation, etc), the frozen drool that is located in the second radial gap 116B and the third radial gap 116C may become liquefied (that is, unfrozen), and then the drool 109 may then begin flowing along the valve stem 106 toward: (i) the valve actuator 108, and (ii) the first radial gap 116A. In this case, the drool 109 may become frozen in the first radial gap 116A, provided that the cooling system 114 has sufficient influence to freeze the drool 109 in the first radial gap 116A. The cooling system 114 may be controlled so that the cooling system 114 operates in response to increased heat being experienced by the back-up pad 110 and/or the manifold 102. Thermal sensors (not depicted) may be coupled with the back-up pad 110, the manifold 102 and a controller (not depicted). The cooling system 114 may be controllable via the controller, and for the case where the controller uses a feedback control loop (implemented as software), the cooling system 114 be actuated accordingly to be responsive to the heating condition associated with back-up pad 110 and the manifold 102. Eventually, heating of the manifold 102 and of the back-up pad 110 may temporarily reduce sufficiently enough so that: (i) the drool 109 may become re-frozen in the second radial gap 116B and in the third radial gap 116C, (ii) while the drool 109 remains frozen in the first radial gap 116A. In this arrangement, there are back-up sealing positions that are used for redundant sealing of the valve stem 106.

For the case where the frozen drool that is located in the third radial gap 116C becomes inadvertently liquefied, the frozen drool located in the second radial gap 116B and the first radial gap 116A cooperate to act as a back-up sealing arrangement 117 (that is, redundant sealing). In this manner, the first radial gap 116A, the second radial gap 116B and the third radial gap 116C (which may also be called a plurality of radial gaps) cooperate to act as the back-up sealing arrangement 117. The system 100 may be described as having: (i) the back-up sealing arrangement 117 that includes a plurality of radial gaps 116A, 116B, 116C, and (ii) the cooling system 114 that is positioned relative to the plurality of radial gaps 116A, 116B, 116C, and the cooling system 114 is configured to freeze the drool 109 that is made to enter, under pressure, into the plurality of radial gaps 116A, 116B, 116C. In this way, the drool 109 that becomes frozen substantially reduces flow of the drool 109 along the valve stem 106 and toward the valve actuator 108. This arrangement helps to prolong the service life of the valve actuator 108.

According to a non-limiting variant of the first non-limiting embodiment, the valve actuator 108 includes: (i) a piston chamber 164, (ii) a piston 160, (iii) a set screw 162, (vi) an air cover plate 170, (v) a piston seal 172, (vi) a chamfer 175, and (vii) an air-supply channel 176. The piston chamber 164 is defined in the actuator plate 120. The piston chamber 164 includes a rod side 166 and a bore side 168. The piston 160 is sealable and slidable movable along the inner surface of the piston chamber 164 between the bore side 168 and the rod side 166. A top side of the piston 160 defines a bore extending through a central portion of the piston 160, and the bore is configured to receive the valve stem 106. The valve stem 106 includes shoulders that abut against the piston 160 inside of the bore. The set screw 162 is threadably coupled with the bore of the piston 160. The set screw 162 is mounted to the piston 160 so that the valve stem 106 may be lockably secured or connected with the piston 160, so that when the piston 160 is made to move, the valve stem 106 may also move in response to movement of the piston 160. The air cover plate 170 is attached and sealed with the top side of the actuator plate 120 so that the actuator plate 120 and the air cover plate 170 may define the piston chamber 164. The o-ring 174 is received in the actuator plate 120 so that the o-ring 174 may form an air-tight seal between the air cover plate 170 and the actuator plate 120. The piston seal 172 is received in a side, outer wall of the piston 160. The piston seal 172 faces and seals against the inner wall of the actuator plate 120, so that the piston 160 may: (i) slide relative to the inner wall of the actuator plate 120, and (ii) remain sealed with the actuator plate 120. The chamfer 175 is defined in the actuator plate 120 at an entrance to a valve-stem channel 179. The valve-stem channel 179 is defined by the actuator plate 120. The valve-stem channel 179 leads from the piston chamber 164 to the back-up pad 110. The valve-stem channel 179 is configured to receive the valve stem 106 and to allow the valve stem 106 to slidably reciprocate responsive to the movement of the piston 160 within the piston chamber 164. The valve stem 106 is linearly movable along a longitudinal axis of the valve stem 106, along an axis of movement 188. The air-supply channel 176 is coupled with the bore side 168. The air-supply channel 176 is configured to deliver pressurized air to the bore side 168. For the case where the bore side 168 is pressurized, and the rod side 166 is de-pressurized, the piston 160 is forced to move downwardly toward the clamp side 132, and in response the valve stem 106 is forced to slide downwardly toward a shut-off position, in which melt is blocked from flowing to the gate leading to the mold cavity from the melt passageway 104 (out from a nozzle, not depicted). For the case where the bore side 168 is de-pressurized, and the rod side 166 is pressurized (by air supply circuits which are not depicted, but known), the piston 160 is forced to move upwardly toward the injection side 130, and in response the valve stem 106 is forced to slide upwardly toward a flow-on position, in which melt is permitted to flow to the gate leading to the mold cavity from the melt passageway 104 (out from the nozzle). The melt may flow along a direction of melt flow 190 along the melt passageway 104 defined in the manifold 102, then along a direction of melt flow 186 along the melt passageway 104 that is defined in the manifold bushing 118.

According to a non-limiting variant (not depicted), the valve actuator 108 is installed on the clamp side 132 of the actuator plate 120, and placement of the cooling system 114 is set further away from the clamp side 132 of the actuator plate 120. This arrangement reduces a cooling effect of the cooling system 114 on the back-up pad 110. However, this arrangement may still provide enough cooling effect, but perhaps not as much as the previously described non-limiting arrangement.

According to another non-limiting variant (not depicted), the valve actuator 108 may be replaced by other valve-stem activation mechanisms, such as: (i) an electrical-activation mechanism (not depicted), or (ii) a hydraulic-activation mechanism (not depicted), either of which may be accommodated by a common plate or by individual supports (rack and pinion, etc.).

According to another non-limiting variant, the system 100 further includes a manifold heater 182 that is positioned and supported by the manifold 102. The purposed of the manifold heater 182 is to provide heat to the manifold 102 so that the melt that is located in the melt passageway 104 may remain in a molten state.

According to another non-limiting variant, the back-up pad 110 defines a heat-moderating groove 192 that faces the actuator plate 120. The purpose of the heat-moderating groove 192 is to moderate the amount of heat that is transferred from the back-up pad 110 toward the cooling system 114 that is accommodated by the actuator plate 120. For the case where the heat-moderating groove 192 is relatively large, the amount of heat that is transferred to the cooling system 114 will be less; for the case where the heat-moderating groove 192 is relatively small, the amount of heat that is transferred to the cooling system 114 will be more. The size of the heat-moderating groove 192 is determined to permit the drool 109 that enters the second radial gap 116B and the third radial gap 116C to become frozen.

According to another non-limiting variant, the back-up pad 110 is configured to seal with the valve stem 106, so that the flow of the drool 109 is substantially prevented from: (i) entering the valve actuator 108, and (ii) flowing along a manifold surface that is associated with the manifold 102. The back-up pad 110 defines a drool-capturing chamber 112 at least in part. The drool-capturing chamber 112 is configured to substantially capture the flow of the drool 109 that is conveyed, under pressure, toward the valve stem 106 (along the radial gap) so that the flow of the drool 109 past the back-up pad 110 and along the valve stem 106 is substantially reduced. Specifically, the drool-capturing chamber 112 substantially captures the drool 109 that is conveyed, under pressure, from the melt passageway 104 toward the valve actuator 108 along the valve stem 106.

According to another non-limiting variant, the cooling system 114 is positioned relative to the back-up pad 110, so that cooling system 114 is used to cool (that is, remove heat energy from) the back-up pad 110. More specifically, the cooling system 114 is used to cool a cold inner surface 126 that is associated with the drool-capturing chamber 112. The cold inner surface 126 is located proximate to the valve stem 106. For the case where the back-up pad 110 is cooled by the cooling system 114, and the drool 109 (that is received in the drool-capturing chamber 112) touches the cold inner surface 126, the drool 109 solidifies in the drool-capturing chamber 112, and in this arrangement the drool 109 is prevented from entering the second radial gap 116B that is located or defined between the back-up pad 110 and the valve stem 106 (as depicted in FIGS. 4A and 4B). The effect of the cooling system 114 is to substantially block the drool 109 from flowing past the back-up pad 110 toward the valve actuator 108. The second radial gap 116B is, preferably, sized from about two micrometres to about seven micrometres.

Figure 3:
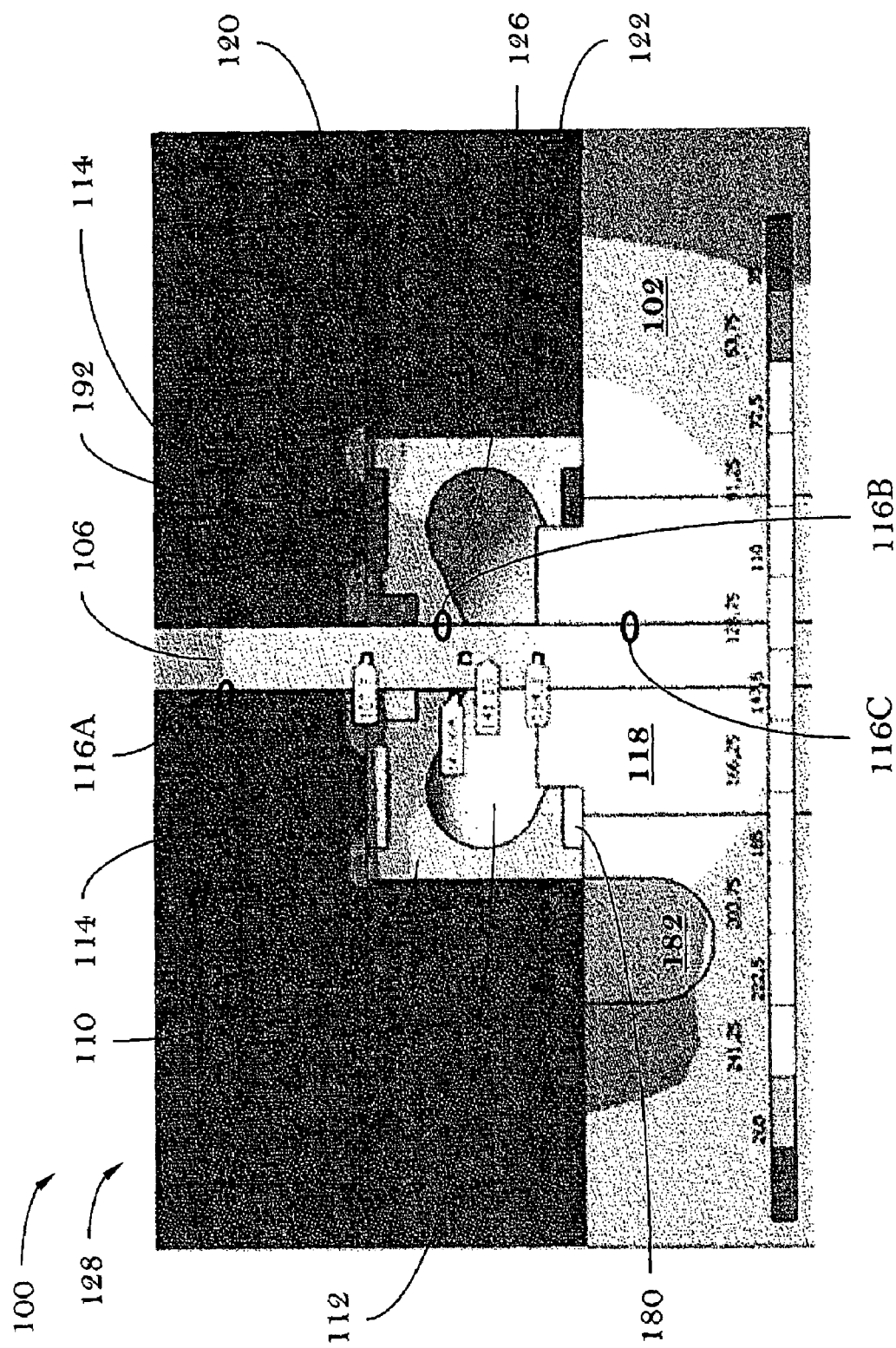
FIG. 3 depicts a thermal profile 128 associated with the system 100 of FIG. 2.

FIG. 3 depicts the thermal profile 128 associated with the system 100. The back-up pad 110 is sealed against the valve stem 106 by way of the thermal profile 128 that is associated with the back-up pad 110. The thermal profile 128 is set up by the cooling system 114. The cooling system 114 is placed proximate to the clamp side 132 of the actuator plate 120, preferably as close as possible to a contact surface located between the back-up pad 110 and the actuator plate 120. As depicted in FIG. 3, the valve actuator 108 is installed on the injection side 130 of the actuator plate 120.

According to a non-limiting variant, the back-up pad 110 is sealed with the valve stem 106. The seal substantially prevents leakage of the drool 109 to: (i) the valve actuator 108, and (ii) the manifold 102. The seal includes: (i) a mechanical seal, and (ii) a thermal seal. The mechanical seal is provided by a tight-tolerance fit between the valve stem 106 and the back-up pad 110. The thermal seal is provided between the back-up pad 110 and the valve stem 106. The thermal seal is supported by the thermal profile 128 that is associated with the back-up pad 110.

According to a non-limiting variant, a temperature of the valve stem 106 at an interface with the manifold bushing 118 is reduced by an influence of the thermal profile 128 associated with the back-up pad 110, so that a viscosity of the drool 109 is increased, so that the drool 109 may harden in a guidance area of the manifold bushing 118 that is used to guide the valve stem 106.

FIGS. 4A, 4B and 4C depict the cross-sectional views of the system 200. FIG. 4A depicts the general location of the back-up pad 110. FIG. 4B depicts a close-up view of the back-up pad 110 according to the system 200. The system 200 may include features and variants that are associated with the system 100 of FIGS. 2 and 3. According to the system 200, the back-up pad 110 includes: (i) a sealing element 124, and (ii) an elastomer element 125. The back-up pad 110 is configured to accommodate the sealing element 124 and the elastomer element 125 by way of a bore defined in the back-up pad 110. The bore defined in the back-up pad 110 faces the actuator plate 120. The sealing element 124 is placed adjacent to the back-up pad 110. The sealing element 124 contacts the valve stem 106 as the valve stem 106 passes through the back-up pad 110. The sealing element 124 substantially reduces the flow of the drool 109 past the back-up pad 110 and toward the valve actuator 108. The sealing element 124 includes a material that is configured to avoid sticking, such as a polytetrafluoroethylene (PTFE) compound. The elastomer element 125 surrounds the sealing element 124. The elastomer element 125 retains (or urges) the sealing element 124 against the valve stem 106. The elastomer element 125 includes an elastomer, which includes any of various polymers having elastic properties of natural rubber.

FIG. 4C depicts another close-up view of the back-up pad 110 according to a variant of the system 200, in which the back-up pad 110 does not define the drool-capturing chamber 112.

Figures 5A, 5B:
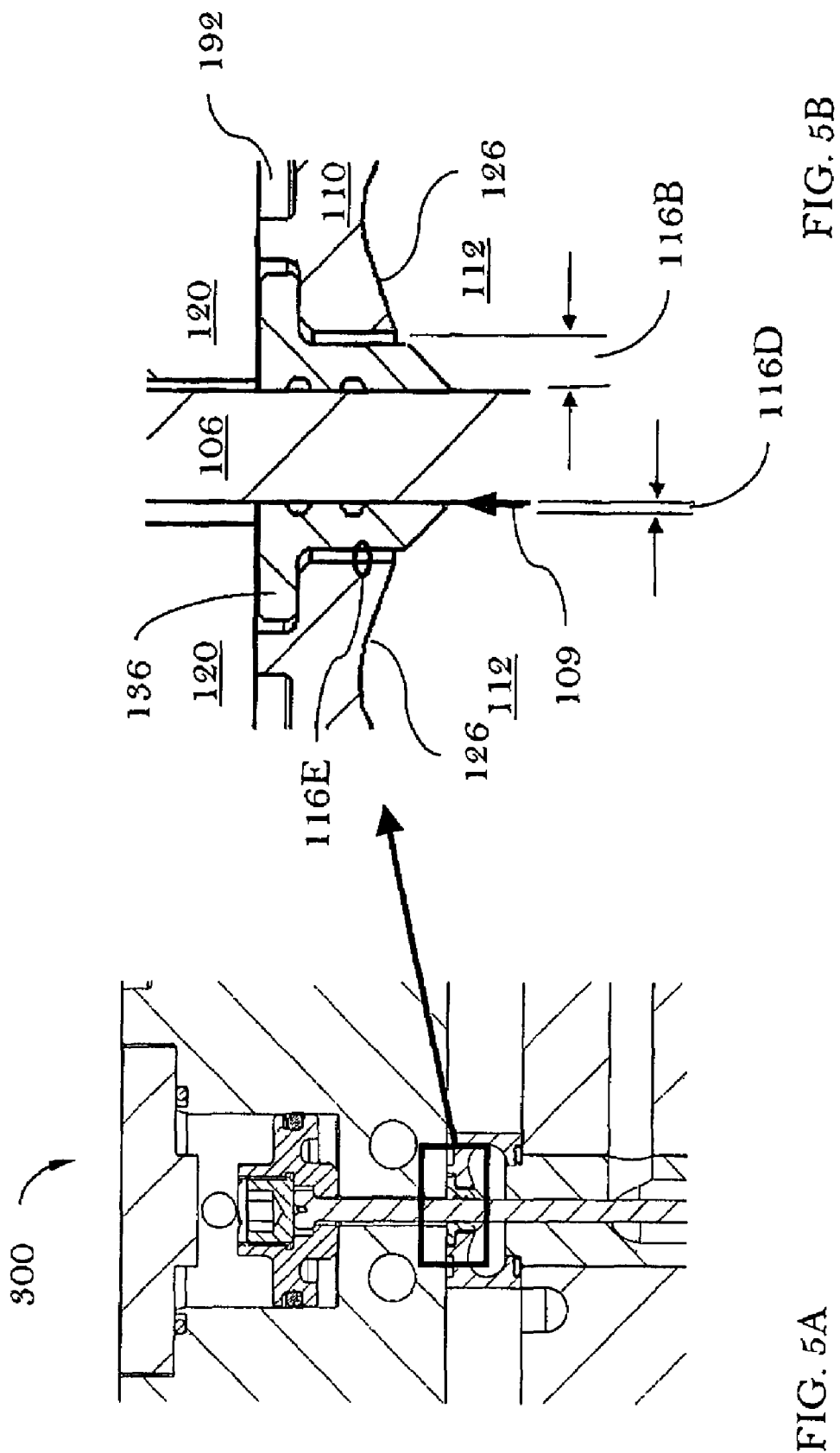

FIGS. 5A, 5B, 5C and 5D depict the cross-sectional views of the system 300. FIG. 5A depicts the general location of the back-up pad 110. FIG. 5B depicts a close-up view of the back-up pad 110 according to the system 300. The system 300 may include features and variants that are associated with the system 100 of FIGS. 2 and 3. According to the system 300, the back-up pad 110 includes or accommodates an insert 136. Specifically, the back-up pad 110 defines a bore that receive the insert 136. The bore of the back-up pad 110 faces the actuator plate 120. The insert 136 is supported by (or received by) the back-up pad 110. Specifically, the insert 136 includes a stepped profile having a shoulder, and the bore of the back-up pad 110 defines a complementary shoulder that abuts against the shoulder of the insert 136. The insert 136 is configured to pass the valve stem 106. The second radial gap 116B is located between the back-up pad 110 and the valve stem 106. The second radial gap 116B (that is, the radial gap between the valve stem 106 and the back-up pad 110) is configured to receive, at least in part, the insert 136. The insert 136 is removable with respect to the back-up pad 110 so as to allow for radial alignment with a manifold bushing 118. The insert 136 includes, by way of example: a steel alloy, a brass or a copper alloy, etc. A stem-to-insert radial gap 116D is defined between the insert 136 and the valve stem 106. A pad-to-insert radial gap 116E is defined between the insert 136 and the back-up pad 110. The frozen drool (that is, once the drool becomes frozen in the stem-to-insert radial gap 116D located between the insert 136 and the valve stem 106) substantially prevents the flow of the drool 109 past the back-up pad 110 along the valve stem 106 toward the valve actuator 108. In terms of total gaps in the system 300, the second radial gap 116B includes the stem-to-insert radial gap 116D and the pad-to-insert radial gap 116E. It will be appreciated that the drool 109 may be frozen in the stem-to-insert radial gap 116D and in the pad-to-insert radial gap 116E.

The insert 136 acts as a heat conductor so that heat may be easily removed from the valve stem 106, and in this manner, cooling of the valve stem 106 may be further improved. The insert 136 may include a high heat conductive material, such as copper. The manifold bushing 118 and the back-up pad 110 are aligned, and if the tolerance between the manifold bushing 118 and the back-up pad 110 is too tight, the valve stem 106 may seize and not linearly slide (this is called the stuck condition). The gap 116D may be arranged to have a very tight tolerance, so that this arrangement may maintain cooling effect to the valve stem stem 106. One solution may be to arrange the insert 136 to allow alignment of valve stem 106 with the manifold bushing 118. The gap 116E provides radial freedom or clearance, FIG. 5C depicts another close-up view of the back-up pad 110 according to a variant of the system 300, in which the back-up pad 110 does not define the drool-capturing chamber 112, and the insert 136 is offset from the manifold bushing 118.

Figure 5D:
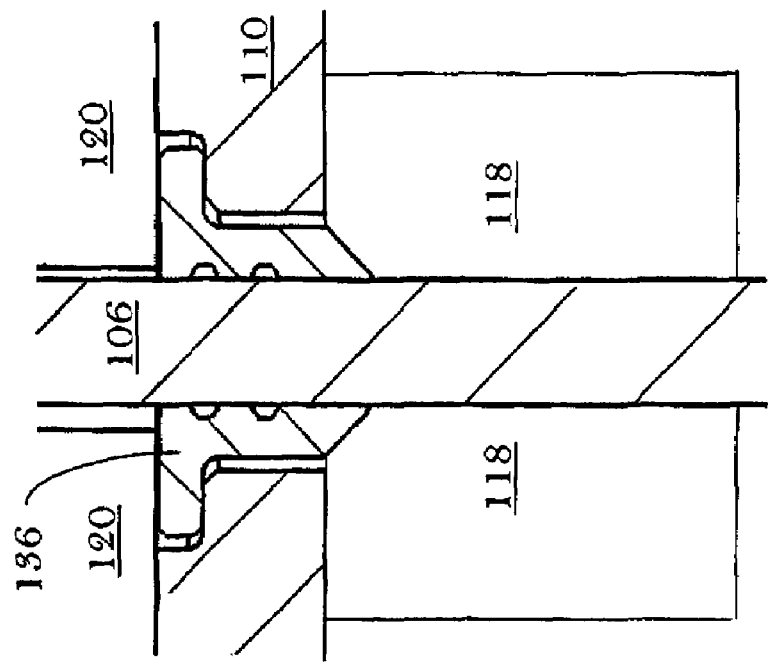
Figure 5C:
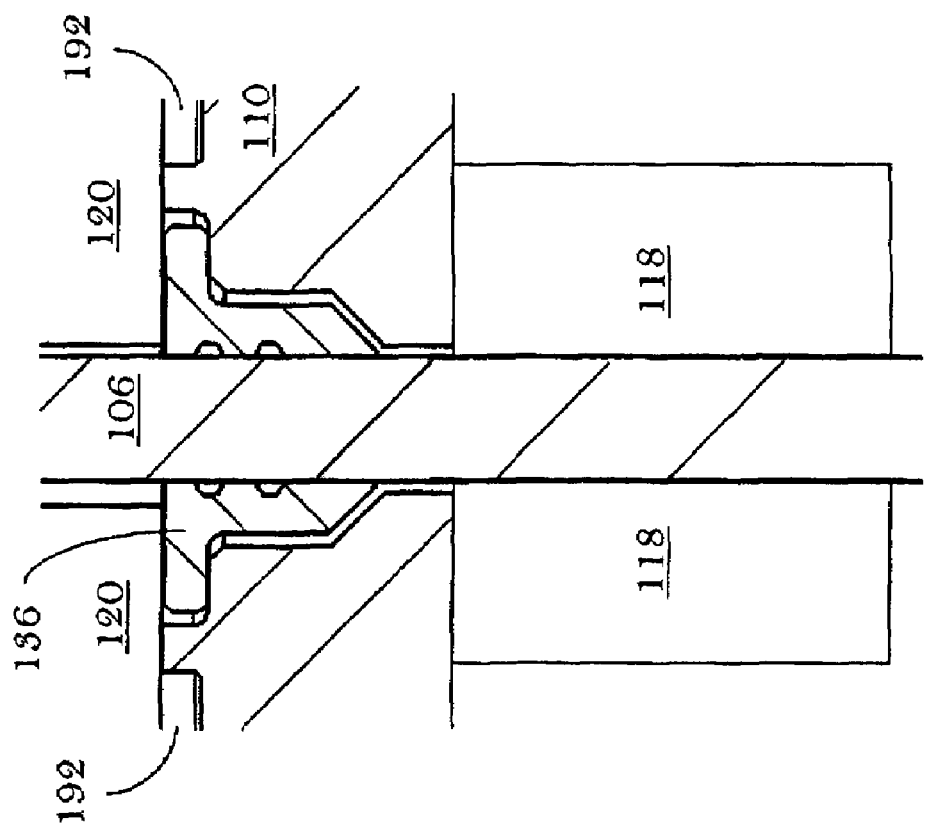

FIG. 5D depicts yet another close-up view of the back-up pad 110 according to another variant of the system 300, in which the back-up pad 110 does not define the drool-capturing chamber 112, and the insert 136 is received at least in part in the manifold bushing 118.

FIGS. 6A, 6B and 6C depict the cross-sectional views of the system 400. FIG. 6A depicts the general location of the back-up pad 110. FIG. 6B depicts a close-up view of the back-up pad 110 according to a first variant of the system 400, in which the back-up pad 110 includes or defines the drool-capturing chamber 112. FIG. 6C depicts a close-up view of the back-up pad 110 according to a second variant of the system 400, in which the back-up pad 110 does not include or does not define the drool-capturing chamber 112. The system 400 may include features and variants that are associated with the system 100 of FIGS. 2 and 3. According to the system 400, as depicted in FIG. 6B, the back-up pad 110 includes an insert body 138 that is supported by the back-up pad 110. The insert body 138 cooperates with the valve stem 106 to prevent the drool 109 from flowing past the back-up pad 110 and toward the valve actuator 108 along the valve stem 106. The insert body 138 is movable with respect to the back-up pad 110 to thus allow for radial alignment with a manifold bushing 118. The back-up pad 110 defines a bore that faces the actuator plate 120, and the bore receives (at least in part) the insert body 138. Between the back-up pad 110 and the valve stem 106 there is defined or located the second radial gap 116B. A stem-to-insert radial gap is not defined between the insert body 138 and the valve stem 106 because the insert body 138 makes slidable sealing, positive contact with the valve stem 106, and in this arrangement the drool does not flow or leak between the valve stem 106 and the insert body 138 as the valve stem 106 is made to slide relative to the insert body 138. The insert body 138 is manufactured to tightly contact the valve stem 106. There is no radial gap between the insert body 138 and the valve stem 106 because the insert body 138 is an over-sized fit relative to the valve stem 106, so that the insert body 138 is firmly sealed relative to the valve stem 106. The pad-to-insert radial gap 116E is defined between the insert body 138 and the back-up pad 110. The second radial gap 116B (that is located between the valve stem 106 and the back-up pad 110) is configured to receive, at least in part, the insert body 138. In this arrangement, the total gaps associated with the system 400 is the second radial gap 116B that includes the pad-to-insert radial gap 116E. The drool 109 that flows along the valve stem 106 is frozen in the pad-to-insert radial gap 116E. The insert body 138 is configured to pass the valve stem 106.

If the insert body 138 is made out of a brass alloy or a copper alloy (which are the preferred material selections), there is no expected increased level of wear compared to the other non-limiting embodiments and non-limiting variants, and it is for this reason that no further consideration is made for reducing wear between the insert body 138 and the valve stem 106. Other alloys may be used in the insert body 138, such as steel, etc. The insert body 138 may include a brass alloy and/or a copper alloy and/or a steel alloy; the differences will be potentially the wear behavior between the valve stem 106 and the insert body 138. An influence on the thermal profile of the valve stem 106 will be minor or even unnoticeable. It will be appreciated that the insert body 138 provides only a mechanical seal, while the insert 136 of FIGS. 5A to 5D provides both a mechanical seal and a thermal seal that influences the thermal profile of the valve stem 106.

According to a non-limiting variant, the back-up pad 110 provides a first function, including back-up functionality between the manifold 102 and the actuator plate 120.

According to another non-limiting variant, the back-up pad 110 provides a second function, including collection of the drool 109. An inner geometry of the back-up pad 110 acts as a collecting pod or chamber for receiving the drool 109 from a valve-stem guidance area that is located between the manifold bushing 118 and valve stem 106.

According to yet another non-limiting variant, the back-up pad 110 provides a third function, including providing a thermal sealing barrier. The contact surface between the back-up pad 110 and the actuator plate 120, which is cooled, creates an effect that the upper portion of the back-up pad 110 including the cold inner surface 126 of the back-up pad 110 acts as a thermal barrier (specific reference is made to FIGS. 2, 4A, 4B, 4C, 5A, 5B, 5C and 5D).

According to yet another non-limiting variant, the back-up pad 110 provides a fourth function, including imparting or transferring a cooling effect on or to the valve stem 106. A contact surface between back-up pad 110 and the valve stem 106 creates the effect that the thermal profile 128 of the valve stem 106 may be influenced. The reduced temperature of the valve stem 106 at an interface to the manifold bushing 118 and the upper portion of a guidance diameter may act as thermal barrier. This arrangement minimizes the amount of the drool 109 that may escape or leaking between the manifold bushing 118 and the valve stem 106 into the back-up pad 110.

According to yet another non-limiting variant, the back-up pad 110 provides a fifth function, including a mechanical sealing function. The sealing element 124 and the elastomer element 125, the insert 136, and the insert body 138, all act as a mechanical-sealing element that may be used to prevent the drool 109 from flowing or leaking beyond the back-up pad 110 to ward the valve actuator 108 along the valve stem 106. The mechanical sealing function is provided by a through hole defined by the back-up pad 110, which is manufactured with a high tolerance in order to defined the second radial gap 116B (relative to the valve stem 106).

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is to be understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is to be protected by way of Letters Patent are limited only by the scope of the following claims:

What is claimed is:

1. A valve-gated hot-runner system, comprising:
    a back-up sealing arrangement, including:
        a plurality of radial gaps associated with a valve stem of a valve actuator; and
        a cooling system being positioned relative to the plurality of radial gaps, the cooling system being configured to freeze a drool being made to enter, under pressure, into the plurality of radial gaps, so that the drool that becomes frozen substantially reduces a flow of the drool along the valve stem and toward the valve actuator.

2. A valve-gated hot-runner system, comprising:
    a first radial gap being located between an actuator plate and a valve stem of a valve actuator;
    a second radial gap being located between a back-up pad and the valve stem;
    a third radial gap being located between a manifold bushing and the valve stem; and
    a cooling system being positioned relative to the first radial gap, the second radial gap and the third radial gap, the cooling system being configured to freeze a drool being made to enter, under pressure, into the first radial gap, the second radial gap and the third radial gap, so that the drool that becomes frozen substantially reduces flow of the drool along the valve stem and toward the valve actuator.

3. The valve-gated hot-runner system of claim 2, wherein: the drool, which becomes frozen in the first radial gap, the second radial gap and the third radial gap, substantially reduces the flow of the drool past the first radial gap, the second radial gap and the third radial gap and along the valve stem toward the valve actuator.

4. The valve-gated hot-runner system of claim 2, wherein: the back-up pad includes:
    an insert being supported by the back-up pad, the insert configured to pass the valve stem,
    the second radial gap is defined between the valve stem and the insert,
    a stem-to-insert radial gap is defined between the insert and the valve stem,
    a pad-to-insert radial gap is defined between the insert and the back-up pad,
    the second radial gap is configured to receive, at least in part, the insert,
    the second radial gap includes the stem-to-insert radial gap and the pad-to-insert radial gap, and
    the drool that flows along the valve stem is frozen in the stem-to-insert radial gap and in the pad-to-insert radial gap.

5. The valve-gated hot-runner system of claim 2, wherein: the cooling system is defined by the actuator plate.

6. The valve-gated hot-runner system of claim 2, wherein: the back-up pad defines, at least in part, a drool-capturing chamber being configured to substantially capture the flow of the drool being conveyed, under pressure, along the valve stem, so that the flow of the drool past the back-up pad and along the valve stem is substantially reduced.

7. The valve-gated hot-runner system of claim 2, wherein: the back-up pad defines, at least in part, a drool-capturing chamber being configured to:
    substantially capture the flow of the drool being conveyed, under pressure, along the valve stem, so that the flow of the drool past the back-up pad and along the valve stem is substantially reduced, and
    capture the flow of the drool being conveyed, under pressure, from a melt passageway toward the valve actuator along the second radial gap.

8. The valve-gated hot-runner system of claim 2, wherein: the back-up pad is configured to seal with the valve stem so that the flow of the drool is substantially prevented from: (i) entering the valve actuator, and (ii) flowing along a manifold surface being associated with a manifold.

9. The valve-gated hot-runner system of claim 2, wherein: the back-up pad includes:
    a cold inner surface being located proximate to the valve stem, the cold inner surface being cooled by the cooling system, so that a portion of the drool becomes frozen once the portion of the drool touches the cold inner surface associated with the back-up pad.

10. The valve-gated hot-runner system of claim 2, wherein: the back-up pad includes:
    a cold inner surface being located proximate to the valve stem, the cold inner surface being cooled by the cooling system, and
    the back-up pad defines a drool-capturing chamber being configured to receive and to capture the drool, and
    once the drool that is received in the drool-capturing chamber touches the cold inner surface of the back-up pad, the drool solidifies so that the drool is prevented from entering the second radial gap.

11. The valve-gated hot-runner system of claim 2, wherein: the back-up pad includes:
    a thermal profile being set up by the cooling system, the thermal profile cooling the drool being located between the back-up pad and the valve stem.

12. The valve-gated hot-runner system of claim 2, further comprising:
    a seal being located between the back-up pad and the valve stem, the seal substantially prevents leakage of the drool to: (i) the valve actuator, and (ii) a manifold, the seal, including:
- a mechanical seal being provided by a tight-tolerance fit between the valve stem and the manifold bushing, and
- a thermal seal being provided between the back-up pad and the valve stem, and the thermal seal being supported by a thermal profile associated with the back-up pad, the thermal profile being set up by the cooling system, so that once a portion of the drool touches a cold inner surface of the back-up pad, the portion of the drool becomes frozen.

13. The valve-gated hot-runner system of claim 2, wherein:
the back-up pad defines, at least in part, a drool-capturing chamber being configured to substantially capture the flow of the drool being conveyed, under pressure, along the valve stem, so that the flow of the drool past the back-up pad and along the valve stem is substantially reduced,
the drool-capturing chamber being configured to capture the flow of the drool conveyed, under pressure, from a melt passageway toward the valve actuator along the second radial gap,
the back-up pad being configured to seal with the valve stem so that the flow of the drool is substantially prevented from: (i) entering the valve actuator, and (ii) flowing along a manifold surface being associated with a manifold, and
the back-up pad includes:
- a cold inner surface being located proximate to the valve stem, the cold inner surface being cooled by the cooling system, so that a portion of the drool becomes frozen once the portion of the drool touches the cold inner surface associated with the back-up pad.

14. The valve-gated hot-runner system of claim 2, wherein:
the back-up pad defines, at least in part, a drool-capturing chamber being configured to capture a flow of the drool being conveyed, under pressure, along the valve stem, so that the flow of the drool past the back-up pad and along the valve stem is substantially reduced,
the drool-capturing chamber is configured to capture the flow of the drool conveyed, under pressure, from a melt passageway toward the valve actuator along the second radial gap, and
the back-up pad is configured to seal with the valve stem so that the flow of the drool is substantially prevented from: (i) entering the valve actuator, and (ii) flowing along a manifold surface being associated with a manifold, and
the back-up pad includes:
- a thermal profile being set up by the cooling system, the thermal profile cooling the drool being located between the back-up pad and the valve stem.

15. The valve-gated hot-runner system of claim 2, wherein:
the back-up pad includes:
- a sealing element being placed adjacent to the back-up pad, the sealing element contacting the valve stem as the valve stem passes through the back-up pad, and the sealing element substantially preventing a flow of the drool past the back-up pad; and
- an elastomer element surrounding the sealing element, the elastomer element retaining the sealing element against the valve stem.

16. The valve-gated hot-runner system of claim 2, wherein:
the back-up pad includes:
- an insert being supported by the back-up pad, the insert configured to pass the valve stem, the second radial gap being located between the insert and the valve stem, wherein:
the second radial gap is defined between the valve stem and the back-up pad, and a stem-to-insert radial gap is defined between the valve stem and the insert.

17. The valve-gated hot-runner system of claim 2, wherein:
the back-up pad includes:
- an insert body being supported by the back-up pad, the insert body configured to pass the valve stem, the insert body tightly contacting the valve stem to as to provide only a mechanical seal between the valve stem and the insert body,
a stem-to-insert radial gap is not defined between the insert body and the valve stem,
a pad-to-insert radial gap is defined between the insert body and the back-up pad,
the second radial gap is configured to receive, at least in part, the insert body,
the second radial gap includes the pad-to-insert radial gap, and
the drool that flows along the valve stem is frozen in the pad-to-insert radial gap.

18. The valve-gated hot-runner system of claim 2, wherein:
the valve actuator is installed on an injection side of the actuator plate.

19. A valve-gated hot-runner system, comprising:
a valve actuator;
a valve stem being operatively attached with the valve actuator;
an actuator plate accommodating the valve actuator, the actuator plate being configured to: (i) receive, at least in part, the valve stem, and (ii) permit sliding movement of the valve stem relative to the actuator plate, the actuator plate and the valve stem, in combination, defining a first radial gap being located between the actuator plate and the valve stem;
a back-up pad being configured to: (i) receive, at least in part, the valve stem, and (ii) permit sliding movement of the valve stem relative to the back-up pad, the back-up pad abutting the actuator plate, the back-up pad and the valve stem defining, in combination, a second radial gap being located between the back-up pad and the valve stem;
a manifold being offset from the actuator plate, the actuator plate in combination with the manifold defining an air gap, the air gap being located between the actuator plate and the manifold, the back-up pad being located between the actuator plate and the manifold, the back-up pad abutting the manifold;
a manifold bushing being received in the manifold, the manifold bushing being configured to: (i) receive, at least in part, the valve stem, and (ii) permit sliding movement of the valve stem relative to the manifold bushing, the manifold bushing and the valve stem defining, in combination, a third radial gap being located between the manifold bushing and the valve stem; and
a cooling system being positioned relative to the first radial gap, the second radial gap and the third radial gap, the cooling system being configured to freeze a drool being made to enter, under pressure, into the first radial gap, the second radial gap and the third radial gap, so that the drool that becomes frozen in the first radial gap, the second radial gap and the third radial gap, substantially blocks a flow of the drool past the first radial gap, the second radial gap and the third radial gap, so that the drool that becomes frozen substantially reduces flow of the drool along the valve stem and toward the valve actuator.

20. The valve-gated hot-runner system of claim 19, wherein:
- the back-up pad defines, at least in part, a drool-capturing chamber being configured to capture the flow of the drool being conveyed, under pressure, along the valve stem, so that the flow of the drool past the back-up pad and along the valve stem is substantially reduced,
- the drool-capturing chamber being configured to capture the flow of the drool conveyed, under pressure, from a melt passageway toward the valve actuator along the second radial gap,
- the back-up pad being configured to seal with the valve stem so that the flow of the drool is substantially prevented from: (i) entering the valve actuator, and (ii) flowing along a manifold surface being associated with the manifold, and
- the back-up pad includes:
  - a cold inner surface being located proximate to the valve stem, the cold inner surface being cooled by the cooling system, so that a portion of the drool becomes frozen once the portion of the drool touches the cold inner surface associated with the back-up pad.

21. An injection-molding system having the valve-gated hot-runner system of claim 1.

* * * * *